(12) United States Patent
Muradov

(10) Patent No.: US 7,914,683 B1
(45) Date of Patent: Mar. 29, 2011

(54) PARTICLES OF SPILLED OIL-ABSORBING CARBON IN CONTACT WITH WATER

(75) Inventor: Nazim Muradov, Melbourne, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 0 days.

(21) Appl. No.: 12/631,394

(22) Filed: Dec. 4, 2009

Related U.S. Application Data

(62) Division of application No. 11/807,803, filed on May 30, 2007, now Pat. No. 7,691,271, which is a division of application No. 10/623,227, filed on Jul. 18, 2003, now Pat. No. 7,473,466, which is a division of application No. 09/851,025, filed on May 8, 2001, now Pat. No. 6,653,005.

(60) Provisional application No. 60/203,370, filed on May 10, 2000.

(51) Int. Cl.
*C02F 1/42* (2006.01)

(52) U.S. Cl. ........ 210/671; 210/675; 210/694; 210/780; 210/263; 210/269; 210/502.1; 210/505; 210/924; 210/242.4

(58) Field of Classification Search .................. 210/671, 210/675, 691–694, 780, 263, 269, 502.1, 210/505, 924, 242.4
See application file for complete search history.

(56) References Cited

U.S. PATENT DOCUMENTS

| | | | |
|---|---|---|---|
| 3,053,775 A | * | 9/1962 | Abbott .......................... 502/420 |
| 3,459,510 A | | 8/1969 | Litz |
| 3,831,760 A | * | 8/1974 | Economy et al. .......... 210/242.4 |
| 4,155,712 A | | 5/1979 | Taschek |
| 4,292,505 A | | 9/1981 | Lee |
| 4,737,161 A | | 4/1988 | Szydklowski |
| 5,110,559 A | | 5/1992 | Kondo |

(Continued)

FOREIGN PATENT DOCUMENTS
WO WO00/21878 4/2000

OTHER PUBLICATIONS
Callahan, Catalytic Pyrolysis of Methane and Other Hydrocarbons, Proc. Conf. Power Sources, 1974, pp. 181-184, vol. 26.

(Continued)

*Primary Examiner* — Chester T Barry
(74) *Attorney, Agent, or Firm* — Brian S. Steinberger; Joyce P. Morlin; Law Offices of Brian S. Steinberger, P.A.

(57) ABSTRACT

Hydrogen generator coupled to or integrated with a fuel cell for portable power applications. Hydrogen is produced via thermocatalytic decomposition (cracking, pyrolysis) of hydrocarbon fuels in oxidant-free environment. The apparatus can utilize a variety of hydrocarbon fuels, including natural gas, propane, gasoline, kerosene, diesel fuel, crude oil (including sulfurous fuels). The hydrogen-rich gas produced is free of carbon oxides or other reactive impurities, so it could be directly fed to any type of a fuel cell. The catalysts for hydrogen production in the apparatus are carbon-based or metal-based materials and doped, if necessary, with a sulfur-capturing agent. Additionally disclosed are two novel processes for the production of two types of carbon filaments, and a novel filamentous carbon product. Carbon particles with surface filaments having a hydrophobic property of oil film absorption, compositions of matter containing those particles, and a system for using the carbon particles for cleaning oil spills.

7 Claims, 5 Drawing Sheets

U.S. PATENT DOCUMENTS

| | | |
|---|---|---|
| 5,229,102 A | 7/1993 | Minet |
| 5,284,717 A | 2/1994 | Yamase |
| 5,366,819 A | 11/1994 | Hartvigsen |
| 5,401,589 A | 3/1995 | Palmer |
| 5,470,360 A | 11/1995 | Sederquist |
| 5,521,008 A | 5/1996 | Lieberman |
| 5,593,640 A | 1/1997 | Long |
| 5,601,937 A | 2/1997 | Isenberg |
| 5,641,585 A | 6/1997 | Lessing |
| 5,643,670 A | 7/1997 | Chung |
| 5,650,132 A | 7/1997 | Murata |
| 5,763,114 A | 6/1998 | Khandkar |
| 5,780,179 A | 7/1998 | Okamoto |
| 5,858,314 A | 1/1999 | Hsu |
| 5,885,451 A * | 3/1999 | Porrovecchio, Sr. ...... 210/242.4 |
| 5,888,470 A | 3/1999 | Engler |
| 5,897,970 A | 4/1999 | Isomura |
| 5,904,854 A | 5/1999 | Shmidt |
| 5,932,181 A | 8/1999 | Kim |
| 5,938,800 A | 8/1999 | Verrill |
| 5,997,594 A | 12/1999 | Edlund |
| 6,077,620 A | 6/2000 | Pettit |
| 6,103,373 A | 8/2000 | Nishimura |
| 6,231,831 B1 | 5/2001 | Autenrieth |
| 6,245,309 B1 | 6/2001 | Etievant |
| 6,299,994 B1 | 10/2001 | Towler |
| 6,409,974 B1 | 6/2002 | Towler |
| 6,423,435 B1 | 7/2002 | Autenrieth |
| 6,436,354 B1 | 8/2002 | Priegnitz |
| 6,451,465 B1 | 9/2002 | Chalfant |
| 7,691,271 B1 * | 4/2010 | Muradov ...................... 210/691 |

OTHER PUBLICATIONS

Rodriguez, A Review of Catalytically Grown Carbon Nanofibers, J. Mater Red., 1993, pp. 3233-3250, vol. 8, No. 12.

Poirier, Catalytic Decomposition of Natural Gas to Hydrogen for Fuel Cell Applications, Int. J. Hydrogen Energy, 1997, pp. 429-433, vol. 22, No. 4.

Amendola, A Novel Catalytic Process for Generating Hydrogen Gas from Aqueous Borohydride Solutions, Advances in Hydrogen, Kluwer Academic/Plenum Publishers, pp. 70-85.

Fuel Cell-Powered Phone Beats Batteries by 3X, Fuel Cell Industry Report, 2000.

Evans, Growth of Klamentary Carbon on Metallic Surfaces During the Pyrolysis of Methan and Aceton, Carbon, 1973, pp. 441-445, vol. 11, No. 5.

Egashira, et al., Whiskerization of Carbon Beads by Vapor Phase Growth of Carbon Fibers to Obtain Sea Urchin-Type Particles, Carbon, 1983, pp. 89-92, vol. 21, No. 1.

Suzuki, et al., Structural Change of Activated Carbon Fibers with Desorption by in Situ X-ray Diffraction, Carbon, 1988, pp. 743-745, vol. 26.

Cloirec, et al., H NMR Investigation on Phenol Saturated and Unsaturated Activated Carbon-Quantification and Exchange Behavior of Protons, Carbon, 1988, pp. 275-282, vol. 26, No. 3.

Audier, et al., Kinetic and Microscopic Aspects of Catalytic Carbon Growth, Carbon, 1988, pp. 317-323, vol. 23, No. 3.

Basic Principles of Organic Chemistry, Roberts and Caserio, 1977, pp. 1464, 2nd ed.

* cited by examiner

PARTICLES OF SPILLED OIL-ABSORBING CARBON IN CONTACT WITH WATER

This application is a Divisional Application of Ser. No. 11/807,803 filed May 30, 2007, now U.S. Pat. No. 7,691,271, which is a Divisional Application of Ser. No. 10/623,227 filed Jul. 18, 2003, now U.S. Pat. No. 7,473,466 which is a divisional application of Ser. No. 09/851,025 filed May 8, 2001, now U.S. Pat. No. 6,653,005, which claims the benefit of priority to U.S. Provisional Application 60/203,370 filed May 10, 2000.

Funded by the U.S. Department of Energy under contract no. DE-FC36-99G010456.

FIELD OF INVENTION

This invention relates to novel filamentous carbon particles, systems and methods for cleaning oil spills from water surfaces.

BACKGROUND AND PRIOR ART

Recent developments in fuel cell (FC) technology have resulted in compact, light-weight devices having the ability to continuously produce electrical power via electrochemical reactions involving an oxidant (usually, air) and a fuel (most preferably, hydrogen). These devices can potentially replace conventional batteries and are particularly useful for portable electronic systems, space and military (e.g. "soldier power") applications, transportation and other systems. However, a compact FC would require a similarly compact and light-weight source of hydrogen. Unfortunately, conventional means of storing hydrogen, including compressed gaseous or liquid hydrogen, as well as, hydrogen cryogenically adsorbed on activated carbons do not lend themselves to use in portable devices. Similarly, the advanced methods of hydrogen storage, such as metal hydrides, catalytically enhanced metal hydrides, carbon nanotubes, also result in relatively low hydrogen storage capacities (below 6 w. %).

To overcome hydrogen storage problems, there have been attempts to produce hydrogen "on demand", i.e. generate hydrogen as needed. In this respect, hydrogen generating systems based on the reactions of different metal hydrides with water are most developed. For example, U.S. Pat. No. 3,459,510 to Litz et al. describe a hydrogen generator which produces hydrogen via the reaction of metal hydride (preferably, sodium borohydride, $NaBH_4$) with water. The reaction was enhanced by the presence of a metal catalyst (preferably, Raney nickel). Recently, Amendola et al. described a catalytic system for generating hydrogen from aqueous borohydride solutions using a ruthenium catalyst (S. Amendola, M. Binder, M. Kelly, P. Petillo, S. Sharp-Goldman, Advances in Hydrogen Energy, Ed. C. Padro and F. Lau, Kluwer Academic/Plenum Publ., NY, 2000). U.S. Pat. No. 4,155,712 to Taschek and U.S. Pat. No. 5,593,640 to Long et al. deal with portable hydrogen generators based on the hydrolysis and thermal decomposition of metal hydrides (e.g. $CaH_2$, $LiAlH_4$). The common disadvantages of these systems based on hydrolysis of metal hydrides is the necessity to carry water and, most importantly, the requisite use of expensive metal hydrides which are irreversibly hydrolyzed into metal hydroxides during hydrogen production. Thus, these systems would require handling of metal hydroxide slurries, which would be very difficult, energy intensive and costly to convert back to original hydride form.

To overcome above problems, a variety of hydrocarbons and other hydrogen containing substances (e.g. alcohols) have been widely used as a source of hydrogen. Since hydrocarbon fuels can be obtained from different sources (petroleum or natural gas), they are abundant, cheap and readily available. There has been a significant progress in the area of development of hydrocarbon reformers (or processors) for producing hydrogen or hydrogen-rich gas for fuel cell applications. For example, U.S. Pat. No. 5,932,181 to Kim et al. describes a hydrogen generator which is able to produce high purity hydrogen from natural gas and water. The generator comprises a desulfurization reactor, a steam reformer, a CO conversion (or water gas shift, WGS) reactor and pressure swing adsorption (PSA) unit. Thus, the process includes the following stages:

a) steam reforming: $CH_4 + H_2O \rightarrow CO + 3H_2$     (1)

b) CO conversion: $CO + H_2O \rightarrow CO_2 + H_2$     (2)

c) $H_2$ purification ($CO_2$ removal) via PSA

The system also requires a large number of heat exchangers, compressors, valves, etc. The steam reforming (SR) process requires a source of water which adds to the weight of the system. This would result in a bulky system potentially difficult to miniaturize. A similar hydrogen generating apparatus is described in U.S. Pat. No. 5,110,559 to Kondo et al. The apparatus consists of a hydrocarbon and air supply systems, a steam generator, a steam reformer, a CO shift converter and gas separation system (PSA). U.S. Pat. No. 5,470,360 to Sederquist discloses an advanced steam reformer with improved distribution of heat within the apparatus. The reformer is applicable to a fuel cell power plant. All these apparatuses are complex and bulky and suffer from the same disadvantages as the previous one. An improved method for producing hydrogen from sulfurous hydrocarbon fuels in the fuel cell electricity generation process is described in U.S. Pat. No. 5,284,717 to Yamase et al. The method is characterized by cracking and desulfurizing petroleum fuels (e.g. kerosene) followed by steam reforming of the desulfurized product. The process is multi-stage, complex and would require an additional source of water. Another multi-stage process for production of hydrogen and energy is described by Engler et al. in U.S. Pat. No. 5,888,470. The process is based on partial oxidation of hydrocarbon fuel and includes a reformer, CO-converter and two gas separation units (a membrane and PSA). Partial oxidation (PO) of natural gas (catalytic and non-catalytic) can be described by the following equation:

$$CH_4 + \tfrac{1}{2}O_2 \rightarrow CO + 2H_2 \qquad (3)$$

This reaction is followed by CO conversion (or WGS) and gas separation (PSA).

A compact hydrogen generator is disclosed in U.S. Pat. No. 4,737,161 to Szydlowski. The apparatus catalytically reforms a hydrocarbon fuel to a hydrogen rich gas for fueling a fuel cell stack. The device features a cylindrical housing with an axial burner and a helical catalyst tube outside of the burner and inside of the housing. U.S. Pat. No. 5,780,179 to Okamoto describes a steam reformer-fuel cell system, where hydrogen is humidified by the recycled water. U.S. Pat. No. 5,938,800 to Verrill, et al. and U.S. Pat. No. 5,897,970 to Isomura et al. describe multi-fuel compact reformers for fuel cell applications. Both patents feature a steam reformer coupled with a hydrogen separating membrane (e.g. Pd-based membrane). The use of selective hydrogen membrane allows to avoid bulky PSA system for the separation of gases and can potentially result in smaller units. However, the apparatuses are complex and require to carry a significant amount of water (e.g. in the first patent, 2-4 moles of steam per mole of carbon in the fuel) (although, some amount of water from the exhaust of FC could be recycled to the reactor). U.S. Pat. No. 5,997, 594 to Edlund et al. discloses a steam reformer with internal hydrogen purification as a source of high purity hydrogen for a polymer electrolyte fuel cell (PEFC). The apparatus includes a steam reformer with internal bulk hydrogen purification and polishing, an integrated combustion method utilizing waste gas to heat the reformer, an efficient integration of heat transfer, resulting in a compact design of the unit. Hydrogen is purified using a thin Pd alloy membrane. A steam-hydrocarbon reformer with a catalytic membrane is disclosed in U.S. Pat. No. 5,229,102 to Minet et al. The use of ceramic membrane permeable to hydrogen and carrying catalytically active metallic substance allowed to significantly reduce the maximum temperature of the process and simplify the design. A steam/methane weight ratio of 3/1 to 5/1 was required to operate the reactor.

A number of patents (e.g. U.S. Pat. Nos. 5,366,819; 5,763, 114; 5,858,314; 5,641,585; 5,601,937) deal with a hydrogen generator integrated with a solid oxide fuel cell (SOFC). For example, U.S. Pat. No. 5,366,819 to Hartvigsen et al. discloses a reformer integrated with SOFC. A thermally integrated steam reformer is located inside the stack furnace housing stacks of SOFC. De-sulfurized natural gas as a feedstock was reformed with a steam over Ni- or Ru-based catalysts. Similarly, U.S. Pat. No. 5,641,585 to Lessing et al. describes a miniature ceramic SOFC with a built-in hydrocarbon reformer using Ni-catalyst. Light hydrocarbons (e.g. propane and butane) are preferred feedstocks for this apparatus. There are several disadvantages common to all these integrated hydrogen generator-SOFC systems. First of all, very high operating temperatures at which SOFC operate (approx. 1000° C.) make them inconvenient for incorporation into small hand-held or other portable devices. Secondly, a preferred feedstock for these devices are desulfurized light hydrocarbon fuels (methane, propane, butane, naphta). The use of heavier hydrocarbon feedstocks (gasoline, diesel fuel, etc.) might promote excessive hydrocarbon cracking reactions causing carbon deposits on the catalytic surfaces, and clogging interstices within the reactor bed. Thirdly, a feedstock should be carefully desulfurized to avoid deactivation of sulfur-sensitive catalysts (Ni or Ru). Desulfurization unit will add to the weight of the apparatus. Fourthly, a significant amount of water might be necessary to drive the reformation reaction and to prevent from coke deposits inside the integrated system. Lastly, they may not be suitable for military applications, since they have an acoustic, thermal, and chemical ($CO_2$) "signatures".

Development of small fuel reformers based on thermocatalytic decomposition (TCD) of hydrocarbons for fuel cell applications has been active area of research. The concept is based on a single-step decomposition (cracking, pyrolysis) of hydrocarbons in air/water-free environment. For example, Calahan has developed a fuel reformer to catalytically convert different hydrocarbon fuels to hydrogen which was fed to a 1.5 kW fuel cell (Callahan, M. Proc. 26th Power Sources Symp., Red Bank, N.J, 1974; p. 181). A stream of gaseous fuel entered one of two reactor beds, where hydrocarbon decomposition to hydrogen took place at 870-980° C. and carbon was deposited on the Ni-catalyst. Simultaneously, air entered the second reactor where the catalyst regeneration by burning coke off the catalyst surface occurred. The streams of fuel and air to the reactors then were reversed for another cycle of decomposition-regeneration. The reported fuel processor did not require WGS and gas separation stages, which was a significant advantage. However, hydrogen was contaminated by carbon oxides which required additional purification step. It was reported most recently on the development of similar hydrocarbon fuel processors based on the catalytic decomposition of natural gas and propane for fuel cell applications (e.g. Pourier, M; Sapundzhiev, C. Intern. Journal of Hydrogen Energy, 1997, v. 22, p. 429-433). Hydrocarbon feedstock is thermocatalytically decomposed in the reactor at elevated temperatures (900-1000° C.) with the production of hydrogen-rich gaseous mixtures and carbon (coke) deposited on the metal (Pd) catalyst surface. After completion of hydrocarbon decomposition stage, air is introduced into the system to burn coke off the catalyst surface. At the heart of the concept is a two-reactor (packed-bed type) system where one reactor is used for hydrocarbon decomposition while the other one is being regenerated. Thus, the whole process runs in a non-steady state regime using complex gas distribution and reagent delivery system. Due to cyclic nature of the process, hydrogen is contaminated with carbon oxides which requires an additional stage of purification using methanator. Furthermore, the above hydrogen generators utilize a number of moving parts, and produce large volumes of $CO_2$ emissions. Several patents are concerned with the use of carbon-based catalysts for decomposition of hydrocarbons into hydrogen and carbon. For example, U.S. Pat. No. 4,056,602 to Matovich deals with the high temperature apparatus to carry out thermal reactions, including decomposition of hydrocarbons, utilizing fluid wall reactors. Thermal decomposition of methane was conducted at 1260-1871° C. utilizing carbon black particles as adsorbents of high flux radiation energy, and initiators of the pyrolytic dissociation of methane. However this apparatus operates at excessively high temperatures and would be very difficult to miniaturize due to its complexity. In U.S. Pat. No. 5,650,132, Murata et al. claim the process for producing hydrogen from methane and other hydrocarbons by contacting them with fine particles of a carbonaceous material obtained by arc discharge between carbon electrodes and having an external surface area of at least 1 $m^2/g$. Carbonaceous materials also included soot obtained by thermal decomposition of different organic compounds (or combustion of fuels), carbon nanotubes, activated charcoal, fullerenes $C_{60}$ or $C_{70}$, and finely divided diamond. The optimal conditions for methane conversion included: methane dilution with an inert gas (preferable methane concentration: 0.8-5% by volume), the temperature range of 400-1,200° C. and residence times 0.1-50 s. Increase in methane concentration in feedstock from 1.8 to 8 v. % resulted in a drastic drop in methane conversion from 64.6 to 9.7% (at 950° C.). Thus, diluted methane feedstock would result in a diluted hydrogen stream which could significantly reduce the efficiency of FC. Also, it was suggested that oxidizing gases like $H_2O$ or $CO_2$ be added to the pyrolyzing zone to improve the catalyst life. However, this would inevitably contaminate hydrogen with carbon oxides and require additional purification step. An International Application No. WO 00/21878 to Arild discloses a method and a device for production of hydrogen and carbon by pyrolysis of natural gas and other organic gases for fuel cell applications. According to this invention, pyrolysis of hydrocarbon feedstock takes place in the reaction chamber with an increasing temperature gradient in the direction of flow from 300 to 2000° C. The reaction chamber contains finely distributed carbon dust which acts as a catalyst. Hydrogen is purified by a membrane filter. The growing carbon particles are trapped by means of a mechanical system (e.g. a centrifuge) in the lower part of the reaction chamber, from where a controlled fraction of carbon particles is recycled, crushed and injected to the upper part of the chamber. There are several aspects of this invention that would make it very difficult to produce a compact device.

Most difficult is the transporting of a controllable amount of solid carbon from the bottom of the reaction chamber through a crushing device to the upper part of the chamber. Secondly, it would be difficult to control the temperature gradient in the reaction chamber if a heat source other than electric coil will be used to drive the endothermic process. Thirdly, the temperature in the upper part of the reaction chamber is 2000° C., which could potentially affect the operation of a closely located membrane. Lastly, the device has many moving parts (e.g. a centrifuge, a carbon crusher, a carbon transporter) which could make it bulky, noisy, and prone to malfunction.

Thus, there is a need for a simple, efficient, compact, cost-effective hydrogen generator which can be coupled to or integrated with a fuel cell to produce a portable source of electrical power.

SUMMARY OF THE INVENTION

The first objective of the present invention is to provide a portable apparatus which utilizes a hydrogen generator coupled to any type of a fuel cell The second objective of the present invention is to provide a portable apparatus which utilizes a hydrogen generator integrated with high temperature fuel cells The third objective of the invention is to develop a compact, portable apparatus for producing hydrogen or hydrogen-rich gas by single-step catalytic decomposition (cracking, pyrolysis) of hydrocarbon fuels and directly using it in a fuel cell for the production of electrical power.

The fourth objective of the invention is to develop a simple compact apparatus with no or minimum moving parts for producing hydrogen or hydrogen-rich gas and electricity by decomposition of hydrocarbon fuels over catalytic materials at elevated temperatures.

The fifth objective of the invention is to produce hydrogen from a variety of hydrocarbon fuels, including, but not limited to, natural gas, liquefied petroleum gases, gasoline, kerosene, jet-fuel, diesel fuel, residual and crude oil, including sulfur-containing fuels.

The sixth objective of the invention is to couple or integrate a compact hydrogen generator with different types of fuel cells such that that it increases specific energy and overall energy efficiency of the portable device.

There are three preferred embodiments of the hydrogen generator-fuel cell apparatus:

A. The first embodiment comprising: a reaction chamber; means for providing heat input into said chamber; a catalytic material for decomposition of hydrocarbons; means for storing and introducing a hydrocarbon fuel into said reaction chamber; a hydrogen selective membrane for purifying hydrogen produced in said reaction chamber; a fuel cell containing at least one electrochemical cell; said electrochemical cell containing an anode and a cathode separated by a membrane; and, an outlet for delivering hydrogen from said reaction chamber to said fuel cell stack whereby it is possible to generate electricity by operation of said apparatus.

B. The second embodiment comprising: a reaction chamber; means for providing heat input into said chamber; means for storing and introducing a hydrocarbon fuel into said reaction chamber; a lower layer of catalytic material for decomposition of said hydrocarbon fuel; an upper layer of catalytic material for increasing hydrogen concentration and production of filamentous carbon; a fuel cell containing at least one electrochemical cell; said electrochemical cell containing an anode and a cathode separated by a membrane; and, an outlet for delivering hydrogen from said reaction chamber to said fuel cell stack whereby it is possible to generate electricity by operation of said apparatus.

C. The third embodiment comprising: a reaction chamber; means for storing and introducing a fuel into said reaction chamber; a high temperature fuel cell which is thermally and spatially integrated with said reaction chamber; a catalytic material for production of gaseous fuel for said fuel cell in said reaction chamber; a compressor for recirculating gaseous products between said reaction chamber and said fuel cell; said fuel cell containing at least one electrochemical cell; said electrochemical cell containing an anode and a cathode separated by a membrane; and, a connector for delivering gaseous fuel from said reaction chamber to said fuel cell stack whereby it is possible to generate electricity by operation of said apparatus.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

According to this invention the above objects can be achieved by decomposition (pyrolysis, cracking) of hydrocarbon fuels in the presence of catalytic materials in oxidant-free environment with the production of hydrogen gas which can be directly fed to a fuel cell. The advantages and features of the present invention will be apparent upon consideration of the following description. The action of the proposed apparatus is based on a single-step decomposition (pyrolysis, cracking) of hydrocarbons in the presence of catalytic materials at temperatures above 400° C. (preferably, 600-1000° C.) and pressure of 1-20 atm (preferably, 1-10 atm) according to the following chemical equation:

$$C_nH_m \rightarrow n/2 H_2 + mC \qquad (4)$$

where:
n is equal or higher than 1,
m/n is equal or less than 4

The lack of oxidizers (air and/or water) in the reactor during hydrocarbon decomposition reaction eliminates the production of carbon oxides (CO and $CO_2$), and, consequently, need for water gas shift reaction and $CO_2$ removal stages required by the reformers based on steam reforming, or partial oxidation, or autothermal reforming. This also eliminates the need for carrying a source of water for the SR and WGS reactors, as well as an equipment to deliver steam (e.g. a water container, a water pump, an evaporator, a heat exchanger, etc.).

Figure 1:
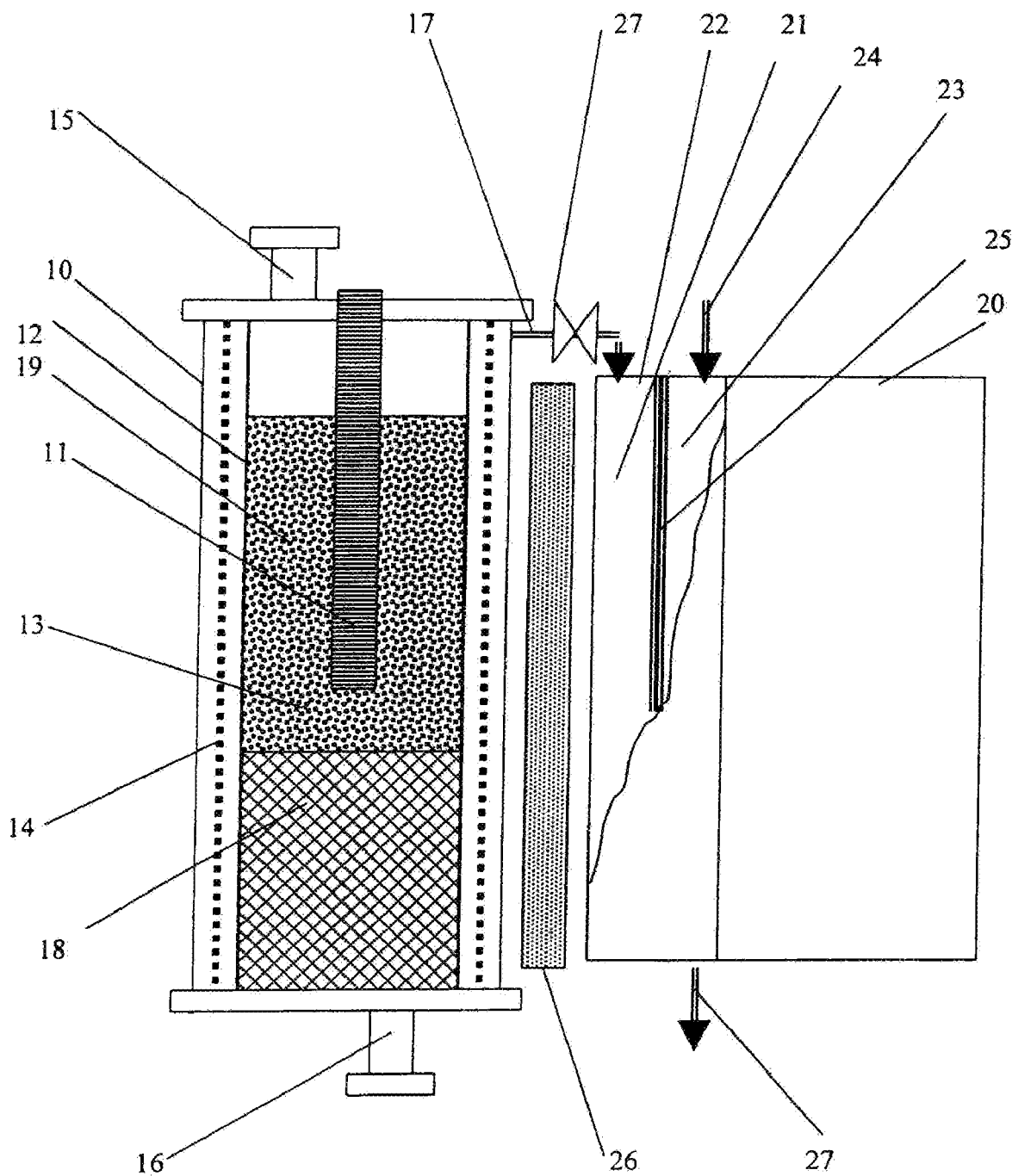
FIG. 1 is a simplified cross-sectional schematic diagram of a compact portable apparatus consisting of a hydrogen generator and a fuel cell; said generator comprising a reaction chamber with a catalyst and a membrane

Reference should now be made to FIG. 1 which illustrates the inventive concept by providing a simplified cross-sectional schematic diagram of the apparatus. In this embodiment, the apparatus consists of a hydrogen generator (HG) 10 coupled with a fuel cell stack 20. In principle, any type of a fuel cell could be used in the apparatus, e.g. PEFC, or SOFC, or alkaline (AFC), or phosphoric acid (PAFC), or molten carbonate (MCFC) fuel cells. However, the PEFC and SOFC types are preferred, for they: do not include a liquid phase; are insensitive to physical orientation; deliver high power density; and, offer low weights, and, volume. These properties make possible convenient miniaturization for portable applications. HG is shown as a cylindrical stainless steel or ceramic vessel containing coaxially located tubular heating element 11, a reaction chamber 12 filled with a catalytic material (CM) 13, and a hydrogen selective membrane 14. The reaction chamber wall is made of a porous ceramic (e.g. alumina) tube. CM 13 is introduced into the reaction chamber via inlet 15, and solid carbon product is dislodged from the chamber after the operation from the same inlet 15. Hydrocarbon fuel is introduced into the reaction chamber via inlet 16. After the reaction chamber is charged with CM 13 and hydrocarbon fuel, the inlets 15 and 16 are closed and the apparatus is ready for portable application. Hydrogen gas exits HG via outlet 17 and enters the anode compartment 21 of the electrochemical cell 22. Air is introduced into the cathode compartment 23 of the electrochemical cell 22 via inlet 24. The anode and cathode compartments of the electrochemical cell 22 are separated by a membrane 25. FC stack 20 contains a plurality of electrochemical cells 22. Since high purity hydrogen is fed to the anode compartment, FC operates in a "dead end" mode (i.e. there is no exhaust from 21). Oxygen-depleted air stream exits from an outlet 27.

A number of catalytic materials with surface area greater than 1 $m^2/g$ (preferably, 100-3000 $m^2/g$), e.g. a variety of activated carbons (AC), or silica gel (SG) or activated alumina (AA), or carbon blacks (CB), or chopped carbon fibers, molecular sieves (MS), plain or doped with transition metals, can be used in the device featuring high catalytic activity in hydrocarbon decomposition reaction. CM 13 can be used in the form of granules or powders with sizes ranging from 0.01 mm to 10 mm (preferably, 0.1-5.0 mm). Gaseous hydrocarbon fuels (e.g. natural gas) are adsorbed onto the surface of CM 13 at pressures of 1-10 atm. Liquefied petroleum gases (e.g. propane, butane) and all liquid hydrocarbon fuels (e.g. gasoline, kerosene, diesel fuel and others) are introduced via inlet 16 such that they soak into a ceramic fiber 18 at the lower part the reaction chamber 12. During operation of the unit, the heating element is heated to 600-1000° C. causing hydrocarbon vapor to decompose over CM 13 in the reaction zone 19 with production of hydrogen, methane and other intermediate products (e.g. ethylene). The lower part of the reaction chamber is somewhat cooler that upper part, thus, preventing liquid hydrocarbon fuel from premature evaporation. As hydrocarbon vapor decomposes, the remaining unconverted hydrocarbon fuel rises from the storage area to the reaction zone 19 by the capillary action. Thus, the lower part of the reaction chamber is utilized as a fuel storage. This eliminates altogether the need for a special fuel storage container, a pump to deliver a fuel to the reaction chamber and a fuel evaporator.

The products of hydrocarbon decomposition move to the periphery of the HG 10, pass through the porous wall of the reaction chamber and hit the membrane. The advantages of using a membrane in the apparatus are three-fold. Firstly, the use of a membrane allows the production of a high purity hydrogen which can be used in any type of FC, without need for PSA and other gas purification devices. For example, commercial Pd or Pd—Ag membrane produce hydrogen with purity of 99.99% and higher. Alternatively, less expensive hydrogen selective ceramic membranes (e.g. porous alpha and gamma alumina and others) could also be used in the device since all provide a useful hydrogen content of >90%. The use of membrane is particularly preferable when gaseous hydrocarbons, e.g. methane, propane, butane, and others, are used as a feedstock in the hydrogen generator. Hydrogen-rich gas produced occupies volumes several times (for liquid fuels, hundreds times) greater than the original hydrocarbon, thus creating driving force for permeation of hydrogen through the membrane. This eliminates the necessity for the use of a compressor or other devices with moving parts, and significantly simplifies the design and greatly improves the compactness of the apparatus. The second advantage of using a membrane relates to the favorable shift in thermodynamic equilibrium of hydrocarbon decomposition reaction. Continuous withdrawal of hydrogen from the reaction zone significantly increases the conversion rate of hydrocarbon feedstock into its constituent elements: hydrogen and carbon. The third advantage of using a membrane is associated with the autocatalytic action of hydrocarbon decomposition reaction in the presence of unsaturated and aromatic hydrocarbons. These hydrocarbons are produced as intermediate products during decomposition of all aliphatic hydrocarbons. It has been found by the author of this invention that the decomposition of unsaturated (e.g. ethylene) and aromatic (e.g. benzene and naphthalene) hydrocarbons produces carbon species which are catalytically active in the decomposition of methane, propane and other hydrocarbons. Thus, once started, the process becomes autocatalytic, since intermediate products further catalyze the decomposition process. The role of the membrane is to contain the gaseous mixture of the original hydrocarbons and intermediate products inside the reaction chamber until they are completely dissociated and converted into hydrogen and carbon. The rate of hydrogen production can be conveniently controlled by the temperature of the heating element 11, and the opening of valve 27 located on an outlet 17. Partial closing of this valve will increase pressure inside the RC 10 and slow down hydrocarbon decomposition process and, consequently, hydrogen production rate.

Addition of special dopants (e.g. ZnO, CaO, Zn, Fe etc.) to the catalytic material prevents production of hydrogen sulfide when sulfurous hydrocarbon fuels are used. This particular feature of the device makes it possible to use any type of hydrocarbon fuel and to feed hydrogen-rich gas directly to the fuel cell without additional purification step. Desulfurizing action of the dopants is based on chemical interaction of the dopant with $H_2S$ at elevated temperatures, for example:

$$ZnO+H_2S \rightarrow ZnS+H_2O \quad (5)$$

$$Fe+H_2S \rightarrow FeS+H_2 \quad (6)$$

Alternatively, known in the art Y-type zeolite- or metallosilicate-based adsorbents can also be used for capturing sulfur from the feedstock.

In general, hydrocarbon decomposition processes are endothermic in nature. Thus, heat input would be required not only to heat up CM 13 and a hydrocarbon to the required temperature, but also to drive the endothermic reaction. The amount of thermal energy required to decompose a hydrocarbon molecule depends mostly on the nature of hydrocarbon. It is the highest for methane (37.8 kJ/mole $H_2$, hereafter at standard conditions) and it gradually decreases with the increase in the molecular weight of hydrocarbon (e.g. for hexane it is 23.98 kJ/mole $H_2$). For unsaturated (e.g. $C_2H_4$) and aromatic (e.g. $C_6H_6$) hydrocarbons, however, the decomposition reactions are exothermic (e.g. for benzene, it is equal to −6.6 kJ/mole $H_2$,). Decomposition of alkylaromatic hydrocarbons is almost thermoneutral (e.g. for cumene, $C_9H_{12}$ it is equal to 0.16 kJ/mole $H_2$). Let's assume that gasoline with the average formula of $C_9H_{16.8}$ is used as a feedstock, then decomposition of gasoline into carbon and hydrogen would require 15.9 kJ/mole $H_2$. The heat input into the system can be provided by several means: most conveniently, by the electric heating element using part of the electric energy produced by FC. Assuming that the average FC efficiency is 50-60%, then 9.5-11.5% of the total amount of hydrocarbon fuel will be consumed to cover heat input requirements of the apparatus. In this case a small rechargeable battery would be required to initiate the process. Alternatively, the heat input could be supplied by passing electric current through a carbon-based CM (carbon materials are widely used as electric heating elements). In this case two electric wires have to be connected to the upper and lower section of carbon CM 13 (not shown in the FIG. 1). Heat will be generated using a part (approx. 10-12%) of electric output of the FC. The third way of providing heat to the reaction zone could be via burning part of the hydrocarbon fuel (not shown on the FIG. 1). In this case only 3% of gasoline feedstock will be needed to drive the process.

In the case where the hydrogen generator is coupled with PEFC which operates at 80° C., thermal insulation 26 would be required to prevent overheating of the FC. The portion of water produced by the FC could be used for humidification of the hydrogen, which is necessary for the normal operation of PEFC (not shown on the FIG. 1). Solid carbon produced during the operation of the apparatus accumulates inside the reaction chamber, therefore provision has to be made to accommodate all the produced carbon inside RC 12. After several refueling operations solid carbon can be dislodged from RC 12. At ambient temperature carbon is an inert and non-toxic product, so it can be safely disposed. It should be recognized that the foregoing description of the preferred apparatus configuration is merely an example and should not be considered limiting in any manner. For example, hydrocarbon storage could be located outside the RC and delivered to the reaction zone by capillary action, or by gravity or by small pump (not shown on the FIG. 1).

Figure 2:
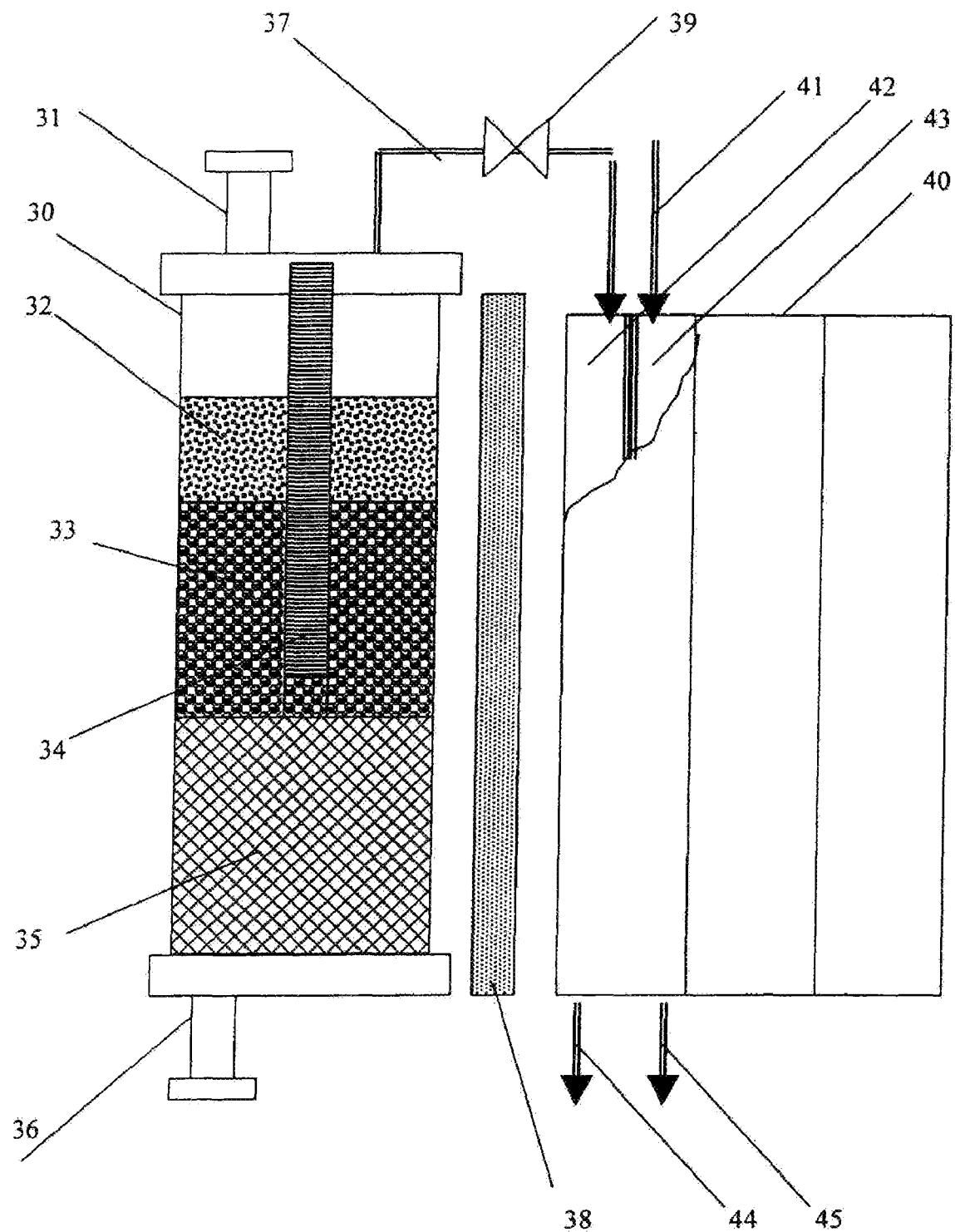
FIG. 2 is a simplified cross-sectional schematic diagram of a compact portable apparatus consisting of a hydrogen generator and a fuel cell; said generator comprising a reaction chamber with two catalytic layers

FIG. 2 refers to a second preferred embodiment of the invention. In this embodiment, the function of the membrane is replaced by the use of a special transition metal-based catalyst which increases the hydrogen content of the gas and remove unsaturated hydrocarbons before it enters a fuel cell. Thus, two layers of catalysts are used in this embodiment: the lower (first) layer 33 is activated carbon, or activated alumina or others; and, the upper (second) layer 32 is Ni-, or Ni—Cu, or Fe- or Co-based catalysts in the form of powder, alumina-supported or in mixture with other oxides or compounds. Both catalytic layers 32 and 33 are heated by a heating element 34 coaxially located in reaction chamber 30 similar to the first embodiment. In this second embodiment, the wall of RC 30 is solid (not porous) and could be made of a metal (e.g. stainless steel) or a ceramic. Liquid hydrocarbons (or liquefied petroleum gases) are introduced into RC 30 from the inlet 36 and soaked into a ceramic fiber 35. The temperature in the layers 32 and 33 is maintained between 600-1000° C. The operation starts with heating up the heating element 34 to the required temperature. Hydrocarbon vapors are decomposed over the lower catalytic layer 33 into the mixture of hydrogen, methane, and higher hydrocarbons. For example, in the case of propane the pyrolysis gas consists of hydrogen, methane, ethylene, ethane, propylene, benzene, naphthalene and others. This gaseous mixture enters the upper catalyst layer 32 containing, e.g. Ni (10 w. %)/$Al_2O_3$ catalyst. Hydrocarbon components of the mixture are further decomposed over Ni-catalyst producing hydrogen and elemental carbon in the form of filaments. The effluent gas exiting the second catalytic layer consists of hydrogen and methane. All unsaturated and aromatic hydrocarbons are effectively decomposed into hydrogen and carbon over the Ni-catalyst. The concentration of hydrogen in the effluent gas depends on the temperature in the catalyst layers and the nature of hydrocarbon. For propane, for example, hydrogen concentration can reach 80-90 v. % with the balance being methane at temperature of 850-900° C. Since no carbon oxides are produced in the hydrogen generator, hydrogen-rich gas can be directly fed to a fuel cell 40 (including PEFC which is prone to deactivation by CO) via the outlet 37. Hydrogen is consumed in the anode compartment 42, while methane exits via outlet 44 and can be used to provide heat for the endothermic process. Air enters the cathode compartment 43 of FC through inlet 41, and the oxygen-depleted air exits through outlet 45. In case a sulfur-containing fuel is used, a sulfur-capturing dopant should be added to the lower catalytic layer 33. Similar to the first embodiment, the hydrogen flow can be controlled by the temperature of the heating element 34 or by opening the valve 39. Also, similar to the first embodiment, the heating element 34 can be heated by the electric coil, or by passing electrical current through a carbon-based CM 33, or by burning part of hydrocarbon fuel. RC 30 and FC 40 are separated by an insulator 38. It should be recognized that the foregoing description of the preferred apparatus configuration shown in FIG. 2 is merely an illustrative example and should not be considered limiting in any manner.

Figure 3:
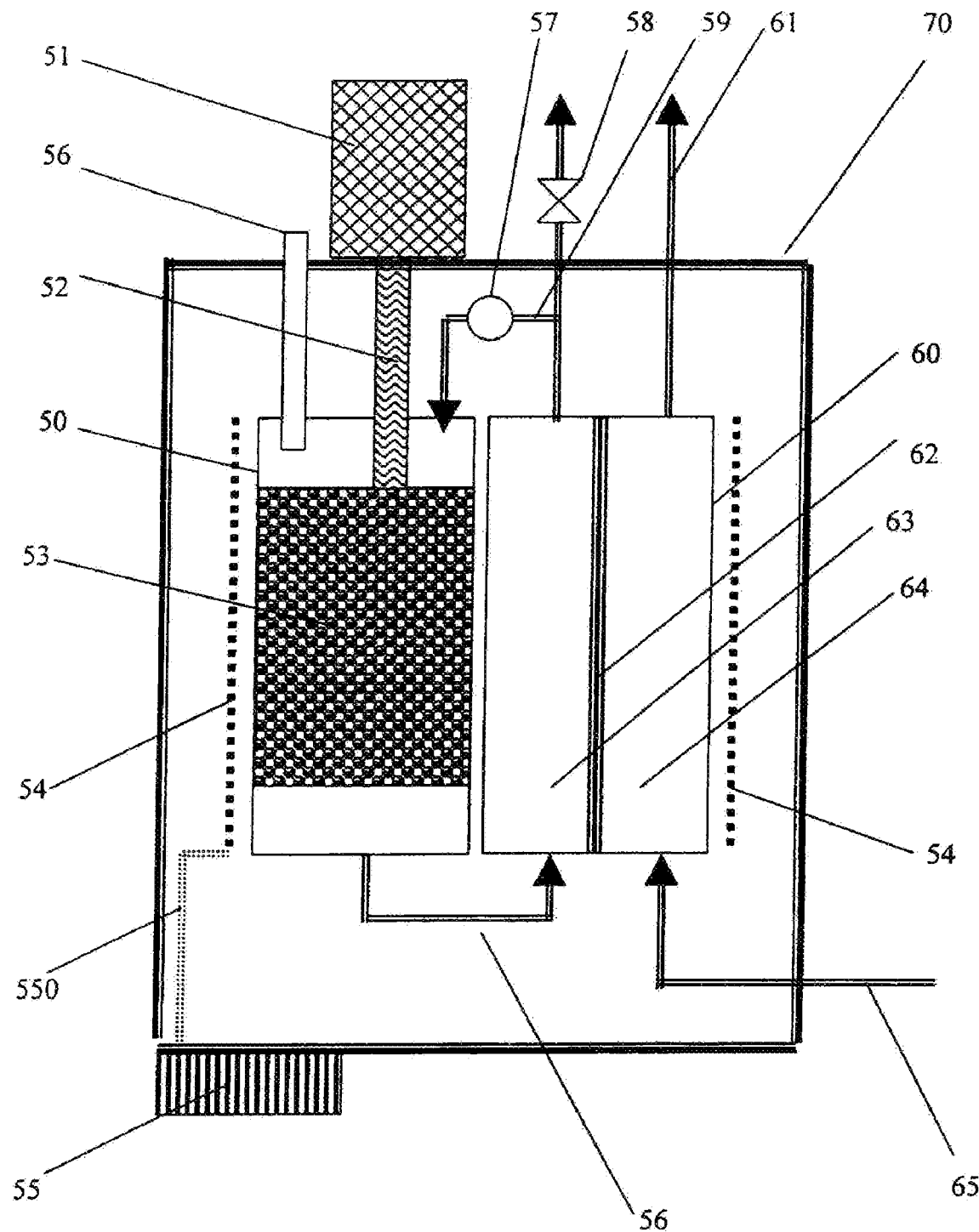
FIG. 3 is a simplified cross-sectional schematic diagram of a compact portable hydrogen generator integrated with a solid oxide fuel cell

The third preferred embodiment of the present invention, as illustrated in FIG. 3, relates the thermal and spatial integration of the hydrogen generator with a high temperature fuel cell. MCFC and SOFC operate at temperatures (600-1000° C.) which is close to that of hydrogen generator operation; therefore, it would be advantageous to integrate the hydrogen generator with a high temperature FC, particularly, SOFC. The apparatus comprises a reaction chamber 50 and a fuel cell 60 mounted into an insulated structure 70. A catalytic material 53 is loaded into RC 50 via inlet 56. CM 53 is selected for having the properties of high catalytic activity in hydrocarbon decomposition, as well as carbon gasification reactions. Useful CMs 53 include: Fe catalyst immobilized onto AC or AA, or silica gel; or mixed oxide Fe catalyst. For sulfur-containing fuels, special dopants (ZnO, CaO, Zn, Al, Fe) should be added to CM 53 to capture $H_2S$ and other sulfurous impurities and prevent them from entering FC 60. A fuel storage 51 is located outside (on the top) of the insulated box to prevent premature decomposition of hydrocarbons. The fuel storage is connected to RC 50 via tubing connector 52 filled with ceramic fiber, such that a hydrocarbon fuel can be delivered to RC by gravity/capillary action. Alternatively, a small pump can be used to deliver the fuel to RC (not shown). Operation of the apparatus starts with the heating up RC 50 and FC 60 to the required operational temperature by a heating element (e.g. electrical coil) 54 wired (550) to a small rechargeable battery 55 located outside the insulated structure (the battery is needed only to initiate the process). Hydrocarbon vapor is decomposed over CM 53 producing hydrogen, methane and heavier hydrocarbons ($C_2^+$) which enter the anode compartment 63 of FC 60 via a connector 56. Simultaneously, air is introduced into cathode compartment 64 via inlet 65; and the oxygen-depleted air exits via outlet 61. Anode and cathode compartments of FC are separated by a membrane 62. For the sake of simplicity, only one electrochemical cell is shown in FIG. 3 (FC stack consists of a plurality of electrochemical cells). Hydrogen is oxidized on the anode surface via electrocatalytic reaction producing electrons and water vapor:

$$H_2 + O^{2-} \rightarrow H_2O + 2e^- \tag{7}$$

Portion of methane and $C_2+$ components of the gaseous mixture are reformed in the high temperature environment of the anode compartment (reaction 1) followed by WGS (reaction 2) producing water and carbon dioxide. The unconverted hydrocarbons are recycled to the RC 50 by a compressor 57 via a connector 59. Steam and $CO_2$ produced in the anode compartment react with carbon deposited on CM 53 surface according to the following equations:

$$H_2O + C \rightarrow CO + H_2 \tag{8}$$

$$CO_2 + C \rightarrow 2CO \tag{9}$$

Fe-based catalyst catalyzes both carbon gasification reactions. The $H_2$—CO mixture along with the hydrogen produced by decomposition of hydrocarbons enter the anode compartment, where they are oxidized on the anode surface into $H_2O$ and $CO_2$ and the process continues in a cyclic mode. The process will carry on even after all the hydrocarbon fuel is decomposed, until all the carbon is converted and removed from the CM 53 surface via gasification reactions. The excessive amount of water vapor produced in the apparatus can be released through valve 58. Thus, both hydrogen and carbon constituents of the hydrocarbon fuel will be consumed by FC, resulting in high specific energy of the apparatus. Due to relatively low endothermicity of hydrocarbon decomposition process (compared to steam reforming) the amount of high temperature heat generated by SOFC (rejected heat) is adequate to cover heat input requirements of the hydrogen generator.

According to the third embodiment of the invention, not only hydrocarbons but also solid fuels such as biomass, petroleum coke and even coal can be used as a fuel source for FC. In this case a solid fuel mixed with the catalytic material (e.g. Fe-catalyst) is placed within the reaction chamber. High temperature pyrolysis of biomass results in production of solid carbonaceous product that remains inside RC and a gaseous mixture containing hydrogen, methane, carbon oxides, water and other organic products of biomass pyrolysis. The gaseous products enter the anode compartment of SOFC, where they are oxidized over the anode surface. Water vapor and $CO_2$ resulted from these oxidation reactions are recycled back to RC, where they participate in gasification of the solid carbonaceous product generating $H_2$—CO mixture. Thus, the process will continue in a cyclic mode until all biomass is consumed. Petroleum coke or coal are mixed with CM (e.g. Fe-based catalyst, or potassium carbonate, $K_2CO_3$, or their mixture) and, if necessary, sulfur-capturing dopant (e.g. ZnO) and loaded in the RC 50. After reaching the required operational temperature, the stream of air (from the same air blower which provides air for a cathode) is introduced into RC 50 resulting in the production of CO-rich gaseous mixture:

$$C + \tfrac{1}{2}O_2 \rightarrow CO \tag{10}$$

CO enters the anode compartment of SOFC where it is oxidized producing $CO_2$:

$$CO + O^{2-} \rightarrow CO_2 + 2e^- \tag{11}$$

$CO_2$-rich mixture is recycled to RC 50, where it gasifies solid carbonaceous fuel (coke or coal) (Reaction 9) producing $CO_2$. The process continues in a cyclic mode until all the solid fuel is consumed by FC. Ash or other residual products from coal or petroleum coke accumulate in RC 50 and can be dislodged during refueling operation.

Thus, the advantages of HG-FC integration include: a) better thermal management of the entire system; b) heat generated by FC drives the endothermic hydrocarbon decomposition reactions, thus, saving 10-15% of a hydrocarbon fuel (which otherwise would be consumed to produce necessary heat); c) both hydrogen and carbon constituents of the hydrocarbon fuel can be utilized, which significantly increases both specific energy and the overall fuel efficiency of the apparatus; d) hydrogen consumption by the anode reduces its partial pressure, thus shifting an equilibrium toward completion of hydrocarbon decomposition reaction; e) the hydrogen generator can operate with minimum moving parts resulting in a quiet apparatus; f) practically, there are no limits for miniaturization of the apparatus; g) the apparatus features a fast response to the load (since there is only one chemical transformation step in HG); and, h) the use of a robust sulfur-resistant catalyst in combination with sulfur-capturing dopant allows the use any type of hydrocarbon fuel, including heavy and sulfur-containing fuels, and solid carbonaceous fuels (biomass, petroleum coke and coal). This is in contrast to prior art portable apparatuses which utilize only light and sulfur-free hydrocarbon feedstocks.

The fourth embodiment of the present invention relates to the novel carbon product produced during hydrocarbon decomposition (particularly, in the first and second embodiments of the invention). It was discovered by the applicant that at certain conditions, hydrocarbon decomposition resulted in the production of novel form of filamentous carbon. It should be noted that the production of filamentous carbons during catalytic decomposition of different hydrocarbons is well known in the art. Particularly, it is well known that hydrocarbons such as methane, ethylene, acetylene, propylene, benzene in mixtures with hydrogen produce carbon filaments (or carbon nanofibers) upon exposure to transition metal catalysts (e.g. Ni, Ni—Cu, Fe, Co) at the temperatures higher than 600° C. (e.g. Rodriguez, N. Journal of Materials Research, v. 8, 3233, 1993). The diameter of carbon filaments is controlled by the size of the catalyst particle and can vary between 2 and 100 nm.

My discovery distinguishes from the prior art in both physical properties and method of production. In the first aspect, carbon filaments produced according to the first embodiment of the invention are approximately 1 micron in mean diameter, "octopus"-like structure shown in FIG. 4. The "octopus" structure consists of a loose, curved, elongated, worm shaped, filament or yarn shaped, graphitic structure wherein a portion is hollow, tubular and longitudinally uniform (thus, they are one to two orders of magnitude thicker than conventionally produced carbon nanofibers). In the second aspect: they are produced in the presence of carbon-based materials (e.g. carbon black (CB) or activated charcoal (AC)), (in contrast to transition metal catalysts used in the prior art);

carbon filaments are preferably produced by decomposition of hydrocarbons (e.g. methane, propane, gasoline) over carbon-based carbonaceous material (CM) by heating it to 850-1200° C., preferably, by passing electric current through it.

Known in the art carbon nanofibers (with the diameter of 2-500 nm) are produced from any hydrocarbon fuel (including heavy sulfurous fuels) by a novel process via hydrocarbon fuel decomposition over two catalytic layers: first (lower) layer being AC, or AA, or SG, or MS mixed with a sulfur-capturing dopant (e.g. ZnO); and second (upper) layer being a transition metal-based catalyst (e.g. Ni-, or Ni—Cu-, or Fe-, or Co-based catalyst). Hydrocarbon fuel decomposes and desulfurizes in the first catalytic layer producing a gaseous mixture comprising hydrogen, methane, ethylene, benzene, naphthalene and other components. The gaseous mixture enters the second catalytic layer where further decomposition of hydrocarbons occur with the production of hydrogen and carbon filaments. After completion of the operation, the catalyst is dislodged from the apparatus, and carbon filaments can be separated from the support material by conventional techniques (e.g. sonication).

Carbon filaments produced by the apparatus can find applications in many traditional areas, e.g. as catalysts and catalyst supports, selective adsorbents, composite materials, reinforcement agents, in energy and hydrogen storage, etc. A novel application for carbon materials produced during operation of the apparatus (concerning first and second embodiment) was discovered by the author of this invention. It was found that carbon products produced by hydrocarbon decomposition over catalytic materials (e.g. AC, CB, Fe-alumina) can be used for the clean-up of oil spills on the surface of water. The invention takes advantage of the combination of two features characteristic of the carbon-product: distinct hydrophobic nature of the carbon surface, and the presence of carbon fibers which act as a hydrophobic "sponge" and readily adsorb the oil. Scattering of carbon-product particles over the surface of oil spill results in breaking of the oil pellicle and formation of a plurality of oil/carbon isles separated from each other. These isles can be conveniently removed from water surface by "brushing" with net. The captured oil can be easily retrieved from the oil/carbon slurry using conventional techniques (e.g. press separator). Alternatively, if heavy carbon/support particles (e.g. carbon deposited on Fe-based catalyst) are used for oil spill clean-up, the isles will slowly sink and remain under the water until oil is microbiologically consumed.

The features of the present invention are apparent from the following examples. Examples 1 through 6 demonstrate catalytic action of selected CM in decomposition of different hydrocarbons.

Example 1

An activated carbon (CL-20 brand, produced from coconut shells by Barneby Sutcliffe Corp.) in the form of 1 mm granules with the surface area of 1650 m$^2$/g was used as a catalytic material. 0.5 g of AC was placed in a quartz tubular reactor (volume 5 ml) with closed end; the reactor was heated by the external electric heater to 500° C. and purged with an inert gas (Ar) using a thin (OD 1.6 mm) ceramic tubing reaching the bottom of the reactor in order to remove adsorbed water and entrained air from the catalyst. The reactor cooled to room temperature and 0.2 ml of gasoline was introduced to the bottom of the reactor using the same ceramic tubing such that it soaked into lower catalyst layer. The ceramic tubing was removed and the reactor connected to a gas meter. This was followed by heating the upper part of the catalyst layer to 850° C. and slowly moving a heater downward to the bottom of the reactor. The total of 148 ml of gas with the average production rate of 7.5 ml/min was collected in the gas meter with the following composition (v. %): $H_2$–76.25, $CH_4$–23.75, with traces of $C_2^+$ hydrocarbons. Based on the hydrogen yield, the specific energy (SE) achieved in this system was 2.3 kW$_{th}$h per kg of fuel (not including the external source of electric energy). If this reactor is connected with a PEFC (with the efficiency of 50%) SE of the entire power system would be close to 1 kW$_e$h per kg of fuel (assuming that 10% of the electric energy output was used to heat up the hydrogen generator). This value of SE is three times higher than that of the advanced methanol/water reformer (300 Wh per kg of fuel) reported in the literature (e.g. Fuel Cell Industry Report, v. 1, No. 4, 2000).

Example 2

The experimental conditions of this experiment and the reactor were similar to the Example 1, except a ceramic fiber (volume 0.5 ml) was place at the bottom of the reactor and 0.41 g of diesel fuel was soaked into it. The reactor was maintained at 850° C. 405 ml of gas with the average production rate of 10 ml/min was collected in the gas meter. The composition of the gaseous mixture was (vol. %): $H_2$–69.21, $CH_4$–30.21, $C_2$+–0.58.

Examples 3-6

The following Table demonstrates other examples of the device operation using different CM and hydrocarbons at T=850° C., P=1 atm, CM=0.5 g. Liquid hydrocarbons 0.2 g.

TABLE 1

| Example | Catalytic Material | Hydrocarbon | Gaseous Products, vol. % | | | | |
|---|---|---|---|---|---|---|---|
| | | | $H_2$ | $CH_4$ | $C_2H_6$ | $C_2H_4$ | $C_3$+ |
| 3 | AC, CL-20 | Hexane | 80.74 | 10.88 | 2.46 | 4.50 | 1.43 |
| 4 | AC, KBB* | Iso-octane | 58.69 | 31.36 | 0.97 | 2.53 | 6.45 |
| 5 | AC, KBB | Propane** | 74.15 | 18.94 | 1.40 | 2.18 | 3.32 |
| 6 | Fe (10 w %)/$Al_2O_3$ | Gasoline | 82.14 | 13.60 | 0.84 | 1.84 | 1.58 |

*KBB is AC produced from a hardwood by NORIT Americas
**Equimolar amount of propane was introduced into the reaction zone via ceramic tubing Examples 7 and 8 demonstrate the feasibility of hydrocarbon decomposition over carbon-based CM heated by means of passing electric current through it.

Example 7

An experimental unit was similar to that of the Example 1, except a ceramic fiber (volume 1 ml) was soaked with 0.8 g of gasoline. 0.7 g of AC (lignite) was placed on the top of ceramic giber. The external wall of the reactor was carefully insulated by several layers of ceramic fiber. Two copper wires with ceramic insulation contacted upper and lower sections of carbon material. Using a transformer, the electrical current was passed through the carbon CM resulting in the generation of heat (900-950° C.) and decomposition of gasoline. The average composition of the hydrogen-rich gas produced was (vol. %): $H_2$–65.35, $CH_4$–24.60, $C_2H_6$–2.10, $C_2H_4$–3.57, $C_3$+–4.38.

Example 8

In this experiment chopped carbon fibers (8 micron in diameter and 6.4 mm long, PAN precursor) were used as CM.

Figure 4:
FIG. 4 is a scanning electron micrographic photo of a sample of filamentous carbon produced by decomposition of propane over chopped carbon fibers.

0.1 g of carbon fibers was placed in a quartz reactor (OD 7 mm) with both ends open. Two copper wires contacted the carbon fibers from both sides, and propane was passed through the reactor with the flow rate of 5 ml/min. Electrical current at 30 V was passed through the carbon fibers causing the heating up of the CM (1000° C.) and decomposition of propane. The composition of gas was (vol. %): $H_2$–96.63, $CH_4$–2.86, $C_2H_2$–0.51. FIG. 4 demonstrates scanning electron micrograph of a filamentous carbon produced during propane decomposition over chopped carbon fibers at 1000° C. These novel carbon filaments appear to have the following characteristics:

one micron mean diameter in average; an "octopus"-like structure; hollow structure;

longitudinally uniform and of graphitic structure.

Examples 9-11 demonstrate the feasibility of decomposition of hydrocarbons over two catalytic layers with production of hydrogen-rich gas and carbon nanofibers.

Example 9

1.0 g of activated alumina (average size 1.5 mm) was placed into a tubular quartz reactor (OD 10 mm). The reactor was heated to 850° C. and purged by Ar to remove adsorbed water and entrained air from the alimina. Propane at the flow rate of 10 ml/min was introduced from the bottom of the reactor. The composition of propane pyrolysis gas after 30 min was (vol. %): $H_2$–50.24, $CH_4$–40.30, $C_2H_6$–2.25, $C_2H_4$–7.21. The reactor was cooled down in a stream of Ar, and second catalytic layer consisting of Fe catalyst (United Catalyst, C12-4-02) in the amount of 0.7 g was placed on top of the first catalytic layer separated by 3 mm thick layer of ceramic fiber. The reactor was purged with Ar, heated up to 850° C. and propane was introduced into the reactor from the bottom at the same flow rate. The composition of the effluent gas was (vol. %): $H_2$–89.77, $CH_4$–10.23. No other products were detected in the effluent gas. The carbon product deposited on the second catalytic layer was produced in the form of carbon nanofibers 0.1-0.2 micron (which are structurally dissimilar to those depicted on FIG. 4).

Example 10

Figure 5:
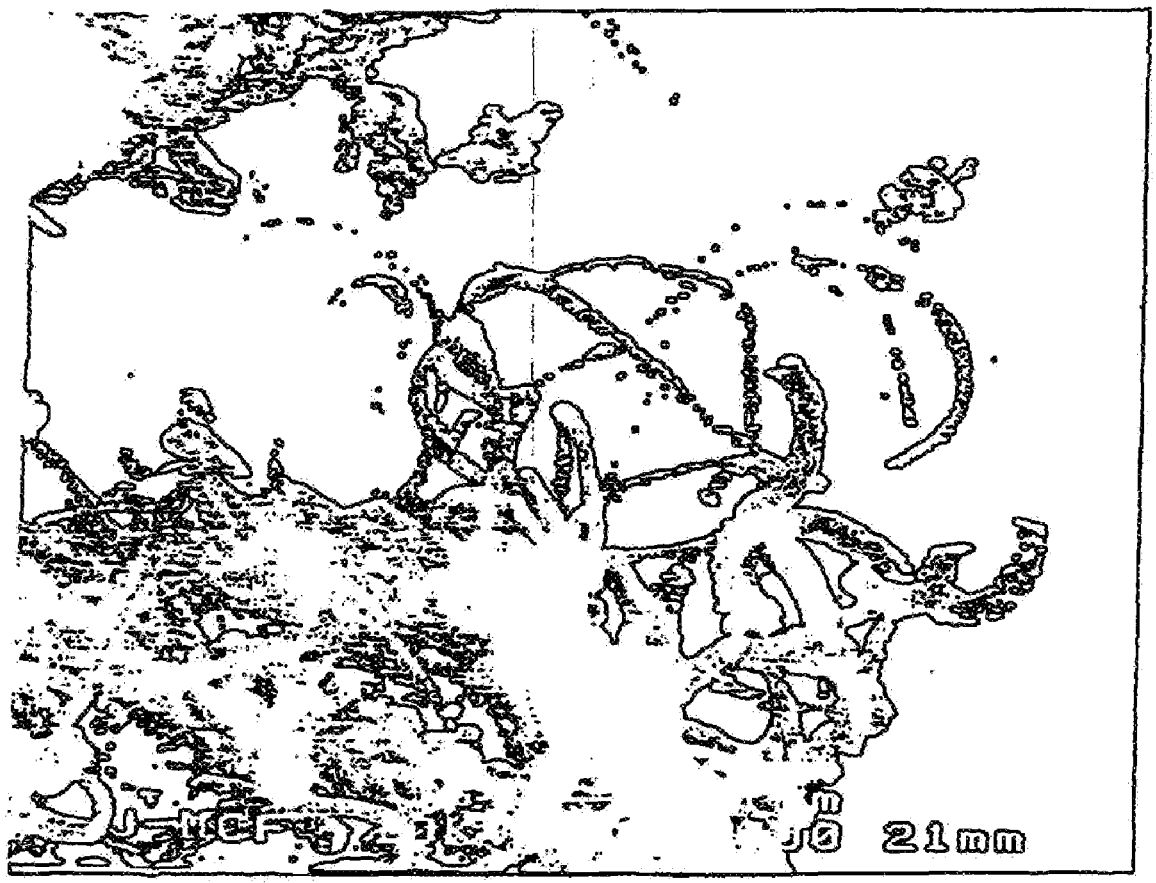
FIG. 5 is a scanning electron micrographic photo of a sample of filamentous carbon produced by decomposition of propane in the hydrogen generator comprising two catalytic layers.

The experimental conditions are similar to the Example 9, except 10 w. % Fe/$Al_2O_3$ was used as a catalyst. FIG. 5 shows scanning electron micrographs of carbon nanofibers produced on the surface of Fe catalyst during decomposition of propane at 850° C. These carbon nanotubes significantly thinner and structurally dissimilar to those depicted in FIG. 4.

Example 11

The experimental conditions are similar to the Example 9, except Ni (55 w. %) on kizelgur (1.0 g) was used as a second catalytic material. The temperature of the second catalytic layer was maintained at 650-700° C. The composition of the effluent gas was (vol. %): $H_2$–74.14, $CH_4$–25.86. No other products of propane pyrolysis were detected in the effluent gas. Carbon deposited on the surface of Ni catalyst in the form of filaments with the diameter in the range of 0.03-0.12 micron.

Examples 12-14 demonstrate the feasibility of gasification of carbon product produced during decomposition of different hydrocarbons over Fe catalyst. Steam and $CO_2$ were used as gasifying agents.

Example 12

The experiment was conducted in a tubular quartz reactor (OD 10 mm). Propane was decomposed at 900° C. over Fe-catalyst (United Catalyst, C12-4-02) (amount 1.1 g, size of granules 1.5 mm) resulting in the production of hydrogen-rich gas and carbon deposited on catalyst surface in the amount of 0.8 g. After completion of propane decomposition reaction, the reactor was purged with Ar, and steam was introduced into the reactor at the same temperature at the rate of 0.10 g/min. The composition of the effluent gas changed with time. At the beginning its average composition was (vol. %): $H_2$–61.6, CO–37.0, $CO_2$–1.4. After 20 min the composition of the effluent gas became (vol. %): $H_2$–66.4, CO–4.2, $CO_2$–29. Over period of 0.5 h practically all carbon was removed from the catalyst surface, and close to 2 L of hydrogen-containing gas was collected.

Example 13

The experimental conditions are similar to the Example 12, except $CO_2$ was used as a gasifying agent. After deposition of carbon (via decomposition of propane) on Fe-catalyst surface, a stream of $CO_2$ at the flow rate of 25.0 mL/min was introduced into the reactor. Concentration of CO in the effluent gas at the onset of the process was averaged at 92.0 vol. %, however, after 20-25 min it started to gradually decline as the amount of coke on the catalyst surface diminished. Over a period of 45-50 min practically all carbon was oxidized and removed from the catalyst surface. This resulted in the regeneration of the catalyst.

Example 14 demonstrates the feasibility of using heavy residual oil as a feedstock for the apparatus.

Example 14

1.0 g of Fe (10 w. %)/$Al_2O_3$ catalyst doped with 5 w. % of $K_2CO_3$ in the form of 2 mm granules was placed in the quartz reactor (OD 12 mm). An atmospheric residual oil (with the density of 0.94 g/mL, and sulfur content of 0.3 w. %) was used as a feedstock. No sulfur-capturing dopant was used in this experiment. The reactor was purged with Ar and maintained at 850° C. The residual oil was introduced into the upper part of the reactor using a syringe pump and a needle. The gaseous product of pyrolysis consisted of (vol. %): $H_2$–10.2, $CH_4$–37.4, $C_2H_6$–6.2, $C_2H_4$–16.2, $\Sigma C_3$–17.1, $\Sigma C_4$–8.1, $C_5$+–2.3, $H_2S$–0.5. After pyrolysis, the reactor was purged with Ar and steam was introduced into the reactor at 900° C. The composition of the effluent gas was (vol. %): $H_2$–72.4, CO–7.9, $CO_2$–17.5, $CH_4$–0.9, $H_2S$–0.3. Thus, carbon was effectively removed from the catalyst surface via steam gasification reaction with the production of hydrogen-rich gas.

HG-FC systems could be used in the wide range of electrical power supply devices, but they are particularly advantageous in portable power devices under 10 kW range (e.g. portable computers, electronics, cellular phones, etc.), and for special applications (space, medicine, military, etc.).

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A carbon particle cleanup system for cleaning oil spills, comprising:
- a plurality of carbon particles with surface filaments having a hydrophobic property of oil film adsorption:
- a scatterer for scattering the particles over the surface of an oil spill pellicle on a surface of water, for breaking up the oil pellicle and forming a plurality of separate oil/carbon isles wherein the carbon particle structure functions as a sponge and absorbs oil from the water surface;
- a net for brushing an oil/carbon slurry so that oil/carbon isles are removed from the water surface; and
- a press separator for retrieving captured from the oil/carbon slurry.

2. The system of claim 1, wherein the plurality of carbon fibers with surface filaments used in cleaning oil spills, contains captured oil that is retrieved from the slurry using a press separator, wherein the hydrophobic property includes a hydrophobic sponge to absorb the oil film from the water surface.

3. The system of claim 2, wherein the carbon filaments are approximately one micron in mean diameter, the carbon filaments consisting solely of carbon black, with a structure of loose curved elongated worm shaped filaments, with a portion of the structure being substantially hollow, and each of the loose curved elongated worm shaped filaments being substantially of tubular, longitudinal uniformity and of graphitic structure.

4. A composition of matter comprising:
- a plurality of separate oil/carbon particle isles in physical contact with water, said isles each comprising oil from a spilled oil pellicle and oil-absorbing carbon particles wherein each of said carbon particles is hydrophobic and comprises a) carbon black filaments consisting solely of carbon black and having a mean diameter of approximately one micron, and b) a structure of loose curved elongated worm-shaped substantially tubular and longitudinally uniform graphitic filaments wherein a portion of said structure is substantially hollow.

5. The composition of claim 4, wherein the isles are in physical contact with the water at a water surface.

6. The composition of claim 4, wherein the composition is in physical contact with a net engaged in brushing an oil/carbon slurry.

7. The composition of claim 4, wherein the composition is in physical contact with a press separator comprising captured oil.

* * * * *